United States Patent [19]

Vaughan

[11] Patent Number: 4,949,507

[45] Date of Patent: Aug. 21, 1990

[54] ONE-PIECE EXPANDABLE WEATHERSTRIP

[75] Inventor: Robert A. Vaughan, Dearborn, Mich.

[73] Assignee: The Standard Products Company, Cleveland, Ohio

[21] Appl. No.: 466,998

[22] Filed: Jan. 18, 1990

[51] Int. Cl.$^5$ .............................................. E06B 7/16
[52] U.S. Cl. ...................................... 49/482; 49/377;
49/477; 49/491; 49/506
[58] Field of Search ................. 49/482, 479, 377, 374,
49/491, 506

[56] References Cited

U.S. PATENT DOCUMENTS

| | | | |
|---|---|---|---|
| 4,442,634 | 4/1984 | Kimura | 49/377 x |
| 4,656,784 | 4/1987 | Brachmann | 49/374 X |
| 4,696,128 | 9/1987 | Fukuhara | 49/377 X |
| 4,817,336 | 4/1989 | Kisanuki | 49/479 X |
| 4,843,763 | 7/1989 | Mesnel | 49/491 X |

Primary Examiner—Philip C. Kannan
Attorney, Agent, or Firm—Harness, Dickey & Pierce

[57] ABSTRACT

A belt weatherstrip adapted to engage an end flange of a vehicle for operative sealing between a glass window and a vehicle surface. The flange of the vehicle has an inner surface and an outer surface. The belt weatherstrip is expandable to accommodate adaptability to various vehicle surface contours by allowing expandability of the width of the weatherstrip.

The belt weatherstrip includes an elongated core substrate which has an inner flange portion for abutting the inner surface of the flange and includes an outer flange portion and intermediate portion connecting the inner flange portion with the outer flange portion and a plurality of clips for securing the elongated core substrate to the end flange. An elastomeric sealing lip member is attached to the flange portion for allowing slideable sealing engagement between the flange and a glass pane. The intermediate portion includes a bend therein in its normal position wherein the bend may be selectively straightened to expand the width of the weatherstrip for accommodating varying final applications in a vehicle.

A glass run weatherstrip having a bend in its intermediate leg is also provided for traversing corners of a door window aperture.

16 Claims, 5 Drawing Sheets

ONE-PIECE EXPANDABLE WEATHERSTRIP

BACKGROUND

The present invention relates to a belt weatherstrip and a glass run weatherstrip for a vehicle. More particularly, the present invention relates to a belt weatherstrip or the like which seals the portion of a vehicle between the sliding glass window and the show surface of a vehicle door, for instance.

Belt weatherstrips of the past have generally been utilized to weather-strip sheet metal flange areas of a vehicle, such as found in a vehicle door, for instance, which has a spot welded end flange connecting the outer show surface portion with the inner frame portion of the door. Such weatherstrips commonly include a sealing lip for sealing and stripping water off the glass window and an overhanging elastomeric strip portion which engages the outer show surface of the car door in order to prevent water from entering the flange area.

It is desired in such constructions to provide a strip show surface of the weatherstrip which may include either a colored elastomer strip or chrome strip or the like which aesthetically matches the finishing contours of the vehicle surface, in order to produce a matched fit. In may vehicle designs a transition edge is formed near the flange which becomes a transition point from the weatherstrip show surface to the vehicle door show surface. Such edges generally are not parallel to the flange portion but have certain contours or may taper depending on the design of the vehicle body and doors. Thus, in the past it was necessary to provide separate constructions which would exactly match the particular application depending on the width of the necessary overlying surface.

It is desired that such a belt weatherstrip will blend in with the design of the vehicle body and form a generally continous surface at the transition edge into the vehicle door or the like. This was accomplished, in past constructions, by manufacturing a belt weatherstrip in accordance with the particular tolerances of the particular application. For instance, in prior construction a belt weatherstrip core and show surface were manufactured to a particular specification. After the manufacture of this portion a separately manufactured glass sealing lip member was attached by staples or the like to the first portion and the belt weatherstrip was then assembled onto the vehicle end flange.

Thus, thses prior belt weatherstrips were relatively expensive to manufacture since the tooling and manufacturing equipment used must be changed for each particular vehicle model design. Additionally, such prior belt weatherstrip constructions required a two-step process for attaching the sealing lip portion to the belt weatherstrip core portion thus, adding to the cost of labor involved in assembling the belt weatherstrip.

Therefore, it has been a goal in the art to provide a one-piece belt weatherstrip which would be suitable in such applications, thereby saving the costs of separate operations during manufacture thereof. It has also been a goal in the art to provide a belt weatherstrip which can be adapted to varying contours or transition tapers of the show surface of a vehicle without requiring separate tooling or manufacture thereof. Such a construction would provide for reduced costs in toolin and manufacture of the part resulting in more efficient utilization of resources and costs savings in both manufacture and sales of the part.

It has been an additional problem in the art that when providing a glass run weatherstrip for a window aperture of a vehicle it is sometimes necessary to traverse a corner of the window aperture. In the past this was accomplished by angular bending of a weatherstrip. It was sometimes necessary to thereafter re-strike the glass run weatherstrip in order to provide proper clearance for the vehicle window at the bend in the weatherstrip.

Thus, it has been a goal in the art to provide a glass run weatherstrip which can be formed with a suitable angular bend to traverse a corner of a vehicle window aperture without the necessity of re-striking the glass run weatherstrip.

SUMMARY OF THE INVENTION

According to the present invention there is provided a weatherstrip adapted to engage an end flange of a vehicle for operative sealing between a glass window and a vehicle surface. The flange of the vehicle has an inner surface and an outer surface. The belt weatherstrip of the present invention is adjustable to accommodate adaptability to various vehicle surface contours by allowing adjustability of the width of the weatherstrip.

The belt weatherstrip includes an elongated core substrate which has an inner flange portion for abutting the inner surface of the flange and includes an outer flange portion and intermediate portion connecting the inner flange poriton with the outer flange portion and a means for securing the elongated core substrate to the end flange. An elastomeric sealing lip member is attached to the flange portion for allowing slideable sealing engagement between the flange and a glass pane. The intermediate portion includes a bend formed therein in its normal position wherein the bend may be selectively straightened to expand the width of the weatherstrip for accomodating varying final applications in a vehicle. In the process of the present invention the bend may be formed in an intermediate leg of the weatherstrip to adjust the width of the weatherstrip along its length for accomodating a particular application.

It is therefore an object of the present invention to provide a one-piece belt weatherstrip for an end flange of a vehicle.

It is still further an object of the present invention to provide a one-piece belt weatherstrip which may be adjustable in its width to accomodate for various contours of a vehicle depending on a particular application.

Other advantages of the present invention will be readily appreciated as same becomes better understood by reference to the following description when considered in connection with the accompanying drawings.

Figure 1:
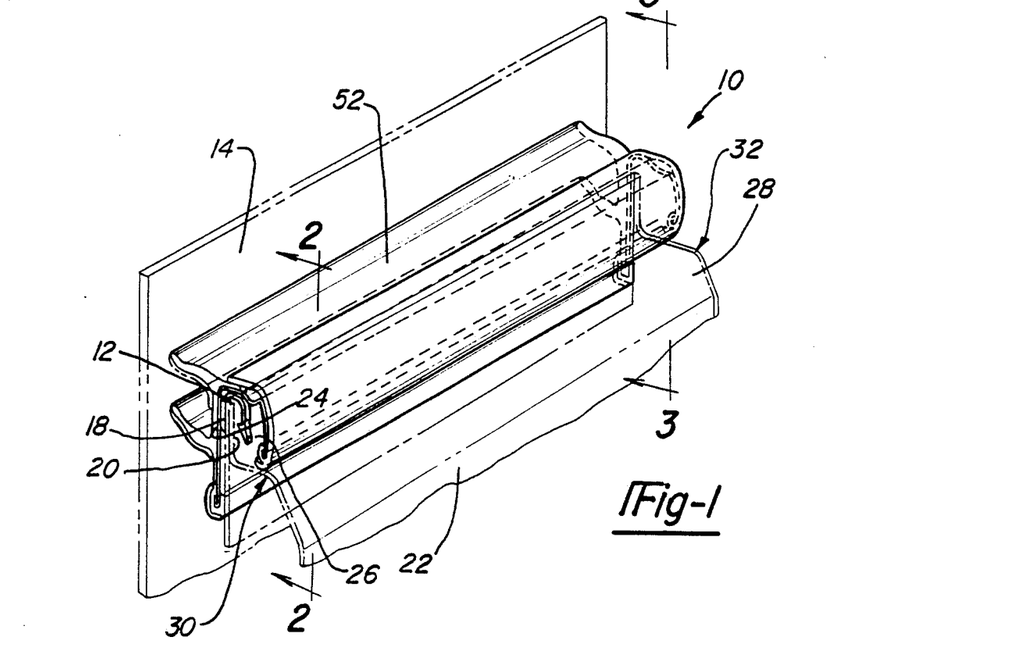
FIG. 1 is a detailed perspective view of the belt weatherstrip of the present invention partially in phantom showing the one-piece nature and the expandability of a belt weatherstrip made in accordance with the teachings of the present invention.
Figure 2:
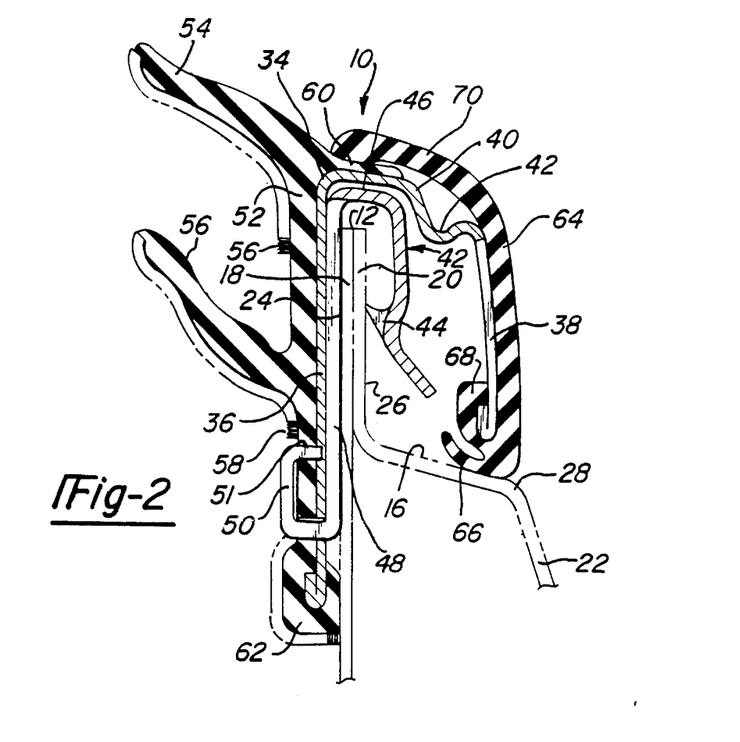
FIG. 2 is a detailed sectional view taken along line 2—2 of FIG. 1 showing the belt weatherstrip in its normal non-expanded position.
Figure 3:
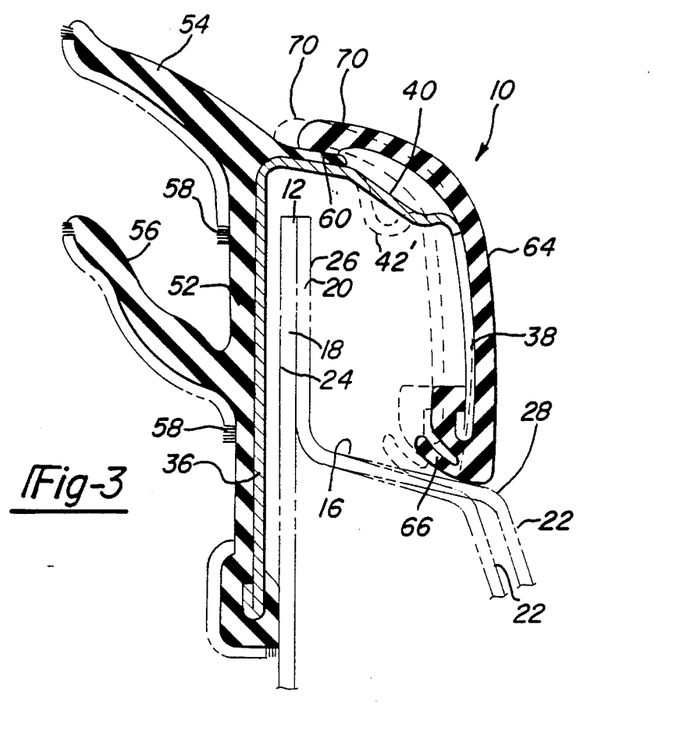
FIG. 3 is a sectional view taken along the line 3—3 of FIG. 1 showing the weatherstrip in its expanded position.

DETAILED DESCRIPTION OF THE PREFERRED EMBODIMENTS referring now to the drawings and more specifically to FIGS. 1, 2 and 3, in accordance with the present invention there is provided a belt weatherstrip generally shown at 10. The weatherstrip 10 is adapted to engage an end flange 12 of a vehicle for sealing between a glass window 14 and a vehicle surface 16. The end flange 12 is generally made up of an inner sheet metal member 18 and an outer sheet metal member 20 which are welded together at flange 12. The outer sheet metal member 20 is configured as part of the outer body shape of the vehicle, such as a door, and includes an outer show surface 22 which is the finished exterior of the vehicle. The flange 12 includes an inner surface 24 and an outer surface 26. The inner surface 24 faces toward the glass channel of window 14 and the outer surface 26 is adjacent the show surface 22.

It is typical in the vehicle construction to have a transition portion 28 which connects the show surface of the vehicle body with the portions forming the flange 12. Such a transition portion may be a bend of varying taper or contour with respect to the flange 12. A shown in FIG. 1, the transition portion 28 is tapered such that it is narrower at a first end 30 and widens out such that it is tapered to the second end 32. Weatherstrip 10 of the present invention is expandable to accommodate and adapt to various transition areas or contours of the door without requiring special tooling and the like.

The weatherstrip of the present invention includes an elongated core substrate 34. The elongated core substrate 34 includes a flange portion 36, a show surface attachment portion 38 and in intermediate portion 40. The flange portion 36 is configured for placement adjacent the inner surface 24 of the flange 12. The intermediate portion 40 connects the show surface portion 38 with the flange portion 36.

The weatherstrip of the present invention also includes a means 42 for securing the elongated core substrate to the end flange 12. As shown in FIG. 2, this means for securing is accomplished by a spring clip which includes a spring loaded biting portion 44, a generally "U" shaped spring portion 46 and a main leg 48. The spring clip is attached to the core substrate 34 by way of grooves formed therein wherein the securement portion 50 interfits and locks by way of the springed leg member 51, as is commonly known is the art. Of course, other types of spring clips and/or rubber or plastic retention lips or clips with various types of securement methods may be utilized without deviating from the scope of the present invention.

A sealing lip member 52 is attached to the flange portion 36 of the core substrate 34. The sealing lip member 52 includes sealing lip portions 54 and 56 which have a flocking or slip coating 58 on their outer surface for engaging the glass surface of a vehicle door window, for instance, to provide for water sealing and stripping action as is commonly know in the art. It is preferred to have a pair of sealing lip portions, as shown in the Figures, however, one sealing lip member may be sufficient depending upon the application. The sealing lip member 52 includes a transversely extending tongue member 60. The tongue member 60 extends over and covers a portion of the intermediate portion 40 of the core substrate 44.

The sealing lip member 52 is attached to the flange portion 36 mechanically at its lower end by the generally "U"shaped configuration 62. Preferably, the lip member 52 is also extruded onto the core substrate for attachment thereto, however, other methods of attaching it may be utilized, such as adhesives and the like, which are readily known to those skilled in the art. The sealing lip member 52 is preferably made of an elastomeric material, such as an EPDM rubber or the like, which are commonly used in the art for this purpose.

A show surface member 64 is attached to the show surface portion 38 of the core 34. The show surface member 64 includes a lower end with a sealing lip 66 extending in a direction toward the end flange 12. The sealing lip 66 sealingly engages the surface 16 and provides an aesthetically pleasing transition from the show surface member 64 of the weatherstrip 10 onto the show surface of the vehicle 22 at the transition portion 28. The show surface member 64 of the weatherstrip is similarly mechanically attached by the overlapping end 68 and preferably is also extruded onto the show surface attachment portion 38 of the core substrate 34. The show surface member 64 includes extending portion 70 which overlaps and contacts the tongue 60 to sealingly engage therewith. The extending portion 70 of the show surface member 64 is unsecured to the core substrate and is slideable along the tongue 60, as will be described more particularly below.

The intermediate portion 40 of the core substrate 34 includes a bend 42 of a predetermined configuration formed along its longitudinal length thereof. The bend 42 of the intermediate portion 40 is preferably of an inward nature (i.e., away from the show surface portion) such that it does not interfere with the aesthetic appeal of the show surface member 64. However, the weatherstrip of the present invention would also function if the bend 42 is formed in an upward direction. Other configurations of the bend 42 may be utilized without deviating from the scope of the present invention provided there is an excess of material which can be utilized for adjusting the width of the weatherstrip. In operation, the bend 42 is arcuate in nature and may be selectively straightened to extend the show surface portion 38 of the core 36 in a direction away from the outer surface 26 of the flange 12 to accommodate varying contours of the vehicle show surface or the transition portion 28 of a vehicle door, for instance.

Thus, as shown in FIG. 1, if a tapered transition surface is to be adapted to, the bend 42 of the weatherstrip 10 may be left in its normally retracted position on the first end 30 and may be straightened in order to extend the weatherstrip to the expanded position, at the end 32. This is more particularly shown in FIG.3 wherein the bend 42 is shown in phantom and may be straightened to provide the extended position shown in solid lines in FIG. 3. Thus, in operation, the portion 70 of the show surface will slide along the tongue portion 60 in order to provide for an extended continuous surface along the length of the belt weatherstip regardless of whether the weatherstrip is in the retracted or extended position.

The weatherstrip also is adaptable to varying contours or curves of the transition portion by selectively adjusting the width of the weatherstrip along various portions of its length in order to follow a curvature in the transition portion 28.

Figure 4:
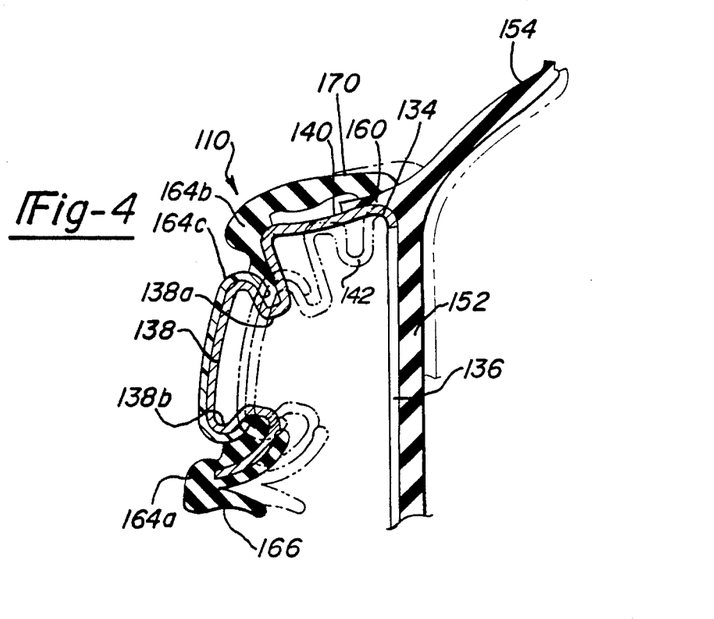
FIG. 4 is a detailed sectional view of an alternate embodiment of a belt weatherstrip made in accordance with the teachings of the present invention wherein a contoured show surface is provided and showing the normal position in phantom.

Referring now to FIG. 4, there is provided an alternate embodiment of the present invention which may be advantageously used to provide a contoured show surface on the weatherstrip as may be desirable in some applications. The operative portions of the weatherstrip 110 in this embodiment are similar to the prior embodiment and thus includes a sealing lip member 152 having sealing lip 154 which member includes a transversely extending tongue portion 160. The core substrate 134 includes an inner flange 136 and a show surface flange portion 138 connected by an intermediate portion 140. As shown in phantom the intermediate leg 140 includes a bend portion 142 along its length which may be extended if necessary to accommodate a transition surface of a vehicle.

The primary difference between this and the prior embodiment is that a contoured core substrate portion 138a is provided for forming a contoured show surface. In the embodiment shown the contoured show surface may include elastomeric portions 164a and 164b which are attached to the core substrate by adhesives or extrusion thereto and the like. The upper elastomeric portion 164b includes a sealing lip member 170 which overlaps the transversely extending tongue member 160. The contoured show surface 136a may also be provided with a chrome trim strip 164c which may be attached to the contoured core substrate at its bulbous portion 138b, as is commonly known to those skilled in the art. Thus, such a construction may be utilized when a chrome trim strip or other contoured surface may be desired in a final construction.

Figure 5:
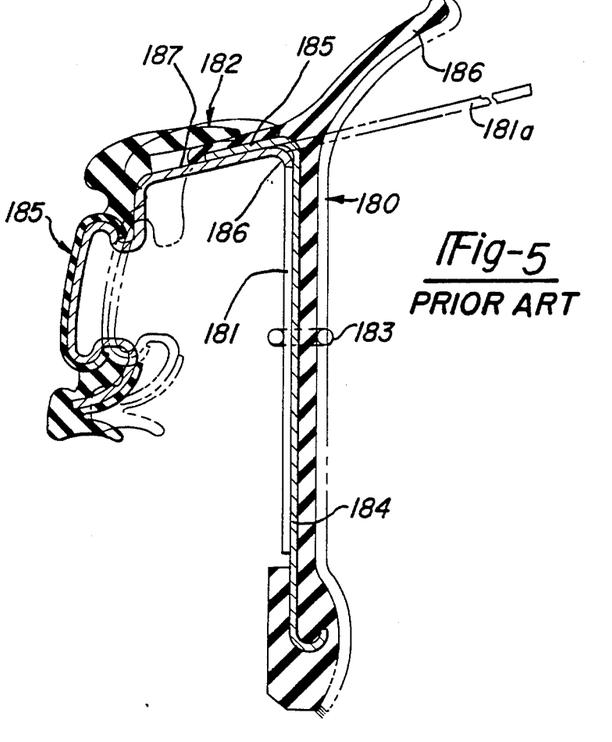
FIG. 5 is a detailed cross-sectional view showing a typical two-piece construction of the prior art.

To further illustrate the advantages and features of the present invention, a view of the prior art method of producing a weatherstrip is shown in FIG. 5. In the prior art construction a separate lip member 180 was formed to be connected to a core flange 181 of a show surface member 182 by staple 183. The lip member 180 included a core substrate 184 which had an overturned flange 185 and an outer elastomeric portion 186. The show surface core portion included the flange portion 181 which was manufactured to include the show surface elements 185 such as the contoured show surface shown. The core flange 181 during manufacturing was left straight as shown at 181a and was bent at the portion 186 to accomodate the varying contours or tapers which were necessary in a particular application.

Thus, if it was necessary to have an extended flange, the portion 181a would be bent to allow a longer intermediate leg 187 to accommodate a wider taper or the portion 181a could be bent to leave a shorter intermediate portion providing for a shorter taper or narrower weatherstrip, as shown in phantom in FIG. 5. Therefore, in the prior art in each particular application, the leg 181A would have to be bent individually to accommodate that application. Thereafter the lip member 180, which was already formed, would be attached to the show surface core by the staple 183. Not only was this a two-step process it also required separate machining and manufacturing for each particular application.

In contradistinction, the subject invention is a one-piece construction which is adjustable in its width to accommodate varying surface countours or transition tapers of a vehicle or to otherwise provide varying weatherstrip widths without a two-step assembly process and without any special machining of the leg 181a as required in the prior art. This reduces the cost of the part and also the cost of labor involved since the part may be manufactured to the same specification regardless of the final applications and thereafter adapted depending on the particular application.

Figure 6:
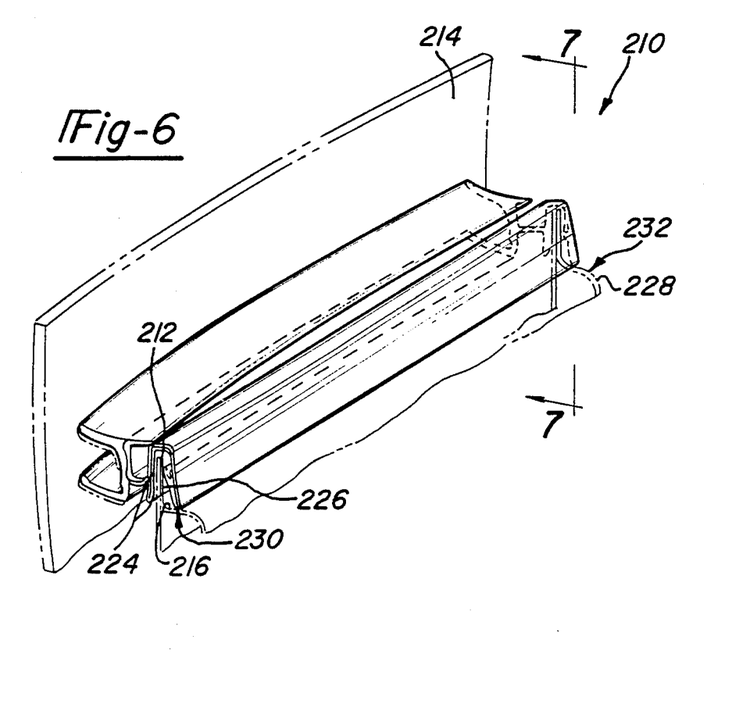
FIG. 6 is a detailed perspective view of an inner belt weatherstrip made in accordance with the teachings of the present invention for an interior door of a vehicle.
Figure 7:
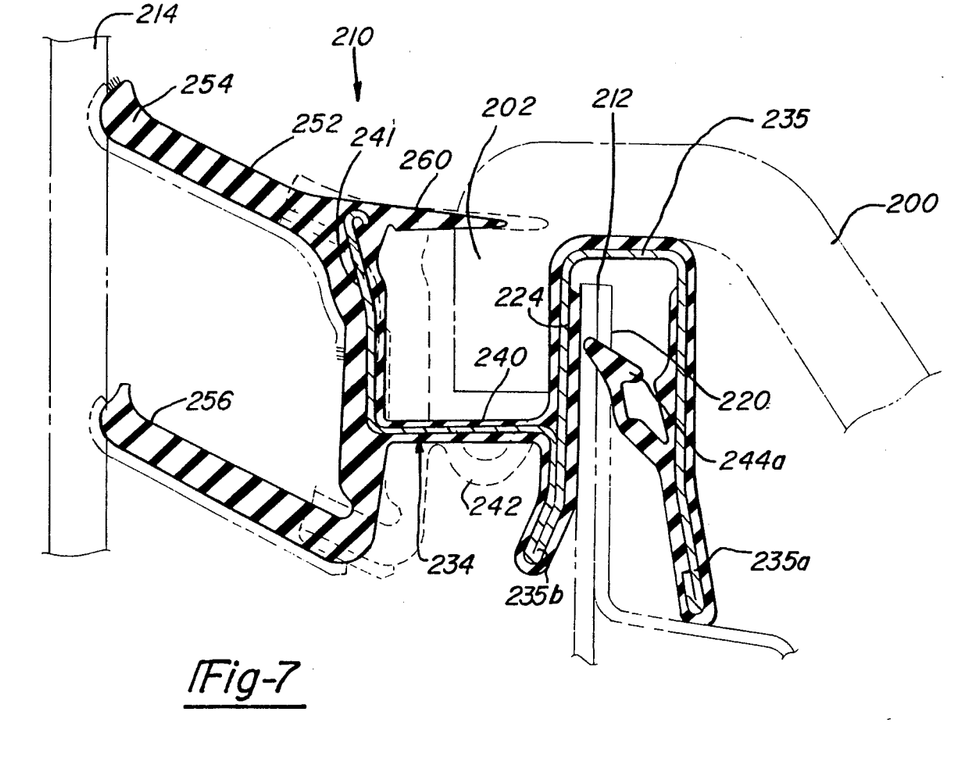
FIG. 7 is a detailed cross-sectional view of the belt weatherstrip of FIG. 6 taken along line 7—7 of FIG. 6.

Referring now to FIGS. 6 and 7, there is provided an inner belt weatherstrip of the like to be attached to the end flange 212 of the interior door of a vehicle. Generally, in the interior of a vehicle, a door panel 200 is provided which includes an overturned lip portion 202 which extends generally over the end flange area of the inner door. In the belt weatherstrip 210 of this alternate embodiment an elongated core 234 is provided which includes a securement flange portion 235 an intermediate leg portion 240 and an outermost flange 241. A sealing lip member 252 is attached to the outermost flange 241. In this embodiment of the present invention the securement flange is formed in a generally "U" shaped configuration with leg portions 235a and 235b. The core substrate is a one-piece construction and the securement leg 235b formed by folding the sheet metal onto itself and then into the "U" shaped portion. The legs 235a and 235b are tapered away from one another at their lower ends to accomodate ease of insertion over the end flange 212. An integrally formed clip 244A is formed which engages the end flange 212 to secure the weatherstrip 210 to the end flange 212.

The sealing lips 254 and 256 are preferably integrally molded onto the core substrate along with the sealing tongue 260. Additionally, in the preferred embodiment of the invention the core substrate 234 is embedded in an elastomeric coating which also forms the attachment clip 244a.

In this embodiment of the present invention the intermediate leg 240 includes a bend portion 242 formed therein which allows the weatherstrip to accommodate for various contours of the door panel 200 or alternatively to allow varying spaces between the glass 214 and the flange portion 212 to be accommodated. Thus, the intermediate leg 240 may be expanded, to any necessary extend, at bend 242, as shown in phantom, to the expanded position (or any position therebetween) as shown in solid lines, to accommodate for varying gaps or necessary contours in a particular application. This allows the tongue portion to be properly positioned for engaging the door panel 200.

In th alternative, according to the process of the present invention, if the particular final application required, the intermediate leg 140 or 240 could be substantially straight in its manufactured condition and thereafter the bent portion 142 or 242 could be formed therein through suitable tooling to adjust the width of the weatherstrip along the length of the intermediate leg for a particular use.

Figure 8:
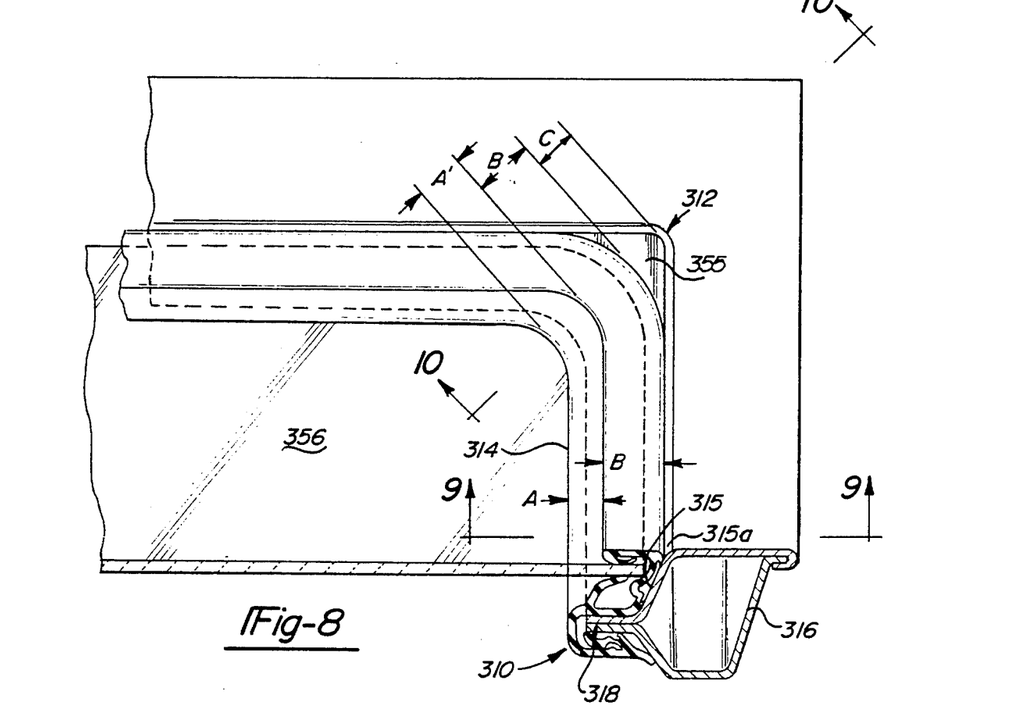
FIG. 8 is an additional view, partially broken away, of a vehicle door window aperture wherein the glass run strip of the present invention is utilized.
Figure 9:
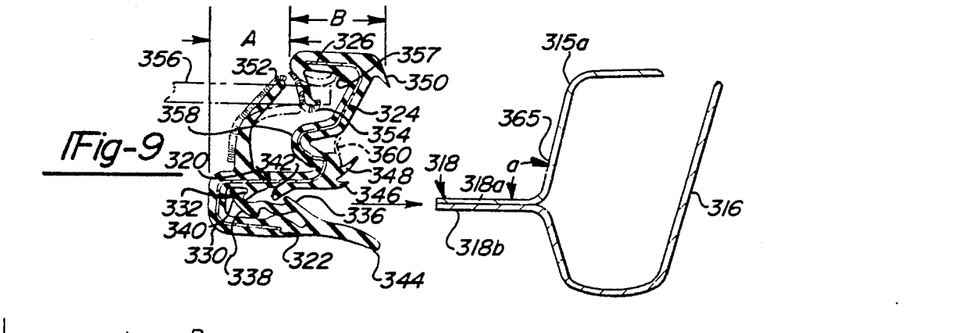
FIG. 9 is an exploded sectional view taken along line 9—9 of the vehicle door of FIG. 8 and showing the section of a glass run weatherstrip made in accordance with the teachings of the present invention.
Figure 10:
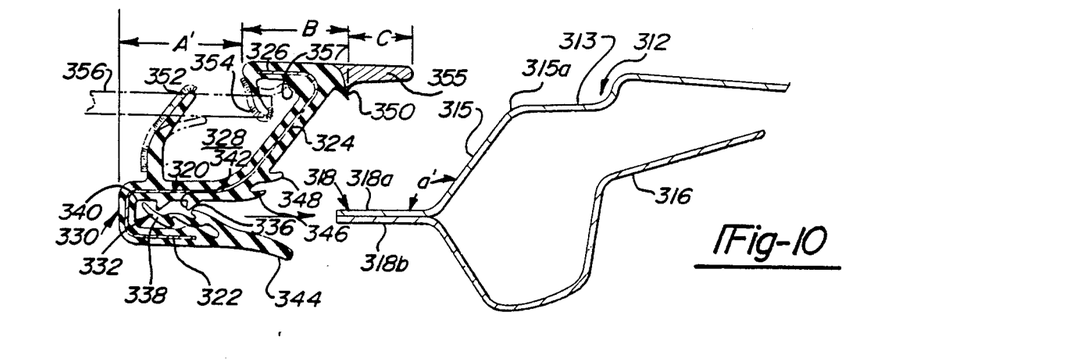
FIG. 10 is an exploded sectional view taken along line 10—10 of the vehicle door of FIG. 8 and showing the window aperture and a section of an alternate embodiment of the present invention expanded to engage the corner portion of the flange of the window aperture.

Referring now to FIGS. 8–10, there is shown an alternate embodiment of the present invention which is incorporated in a glass run weatherstrip 310.

Referring to FIG. 8, glass run weatherstrip 310 is adapted for advantageously being stretch benable for conforming to a corner bend generally indicated at 312 of a window aperture 314 of a vehicle door 316.

The door 316 includes a window aperture 314 formed therein and includes a peripheral flange portion 318 which is formed by flanges 318a and 318b, which are commmonly spot welded together. Referring now to FIGS. 9 and 10, as the belt shelf 315 progresses around the corner portion 312 the rabbit angle a gets greater progressing to angle a' at the corner 312 as shown in FIG. 10. Because of this increased angle at the corner, it is necessary to provide a glass run weatherstrip that compensates for the increased distance to reach the bend 315a at the corner portion 312 during bending of the weatherstrip.

In the past, when providing such a bend in a glass run weatherstrip, it was necessary to provide special tooling to bend the weatherstrip at the appropriate angle and thereafter use a suitable tooling to re-strike the glass run weatherstrip in order to re-form the strip at the corner location to provide proper clearance for the window at the corner thereof. Thus, the prior process required special tooling to re-form the weatherstrip at the corner and the final product, at times, included cosmetic ripples or blemishes at the corner which were not entirely removeable by the re-striking process. Additionally, becaus there was no provisions for adjusting the width of the weatherstrip it was generally necessary to provide a prohibitive amount of material at the corner to fill in uncovered gaps such as corner shelf 313 at the corner portion 312. Thus, the final fit of the weatherstrip left some room for improvement.

The present invention solves this problem and allows forming of the glass run weatherstrip with reduced deformities at the corner portion of the bend in the glass run strip.

Glass run weatherstrip 310 includs a core substrate generally indicated at 320. Core 320 has a"U" shaped portion 322 at a first end of its width, an overturned flange 326 at the second end of its width and an intermediate leg 324 interposed therebetween. A channel 328 is generally formed by the "U" shaped end of the intermediate leg 324 and the overturned flange 326. An extruded outer covering generally indicated at 330 is extruded onto the core 320 and is made of an elastomeric material as is known in the art.

Outer covering 330 includes formed appendages as follows. A securement structure generally indicated at 332 is provided for securing of the glass run strip 310 to the vehicle door flange 318. The securement structure 332 includes a first tongue member 334 which extends into the channel formed by the "U" shaped end. A pair of lips 336 and 338 on the tongue member 334 act in cooperation with opposed lips 340 to frictionally engage the flange 318. The covering 330 also includes sealing protrusions 344, 346, 348 and 350 which provide sealing between the glass run strip and the surface portions of the door 316. Sealing lips 352 and 354 are provided which extend into channel 328 from opposite sides thereof. The sealing lips are deflectable as shown in phantom to allow passage of a glass window pane 356 therethrough during opening and closing of the window.

Referring in particular to FIG. 9, the intermediate leg 324 is provided with a bend 358 formed therein which can be straightened to provide extra width at the intermediate leg 324 where necessary. This is particularly useful in a glass run strip application wherein it is necessary to provide angles in the glass run for traversing corners of a door. The glass run construction of the present invention allows the normal position of the intermediate leg, such as shown in FIG. 8, to be expanded to the position shown in FIG. 9, to traverse the corner of the vehicle door where extra material is needed while providing the proper clearance for the window 356 in the corner portion 357 of the glass run channel 328. Thus, in the present invention, only a relatively small mold corner 355 must be added to the glass run strip 310 for filling in the distance C to cover the corner shelf 313. This provides for a lower cost in materials used and increases the aesthetic appearance at the corner 312 over the prior art weatherstrips. In an alternate embodiment a rubber or plastic web 360 may be provided to seal off the area encompassed by the bend 358, prior to lengthening the intermediate leg 324 by unbending or forming of the arcuate portion 358.

In the construction of the present invention a corner can be traversed with normal bend tooling to bend the strip and adjust the width of the strip without the necessity of use of special tooling after bending to provide clearance at the corner 312 in the corner portion 357 of the glass run channel 328.

Thus, the non-constant distance A which must be compensated for from the "U" shaped portion 322 to the lip 354 is a non-constant distance which may be adjusted to the distance A' in the present invention while the constant distance B below the lip 359 and the corner 357 remains the same to provide proper clearance for the window 356 at the corner 312 portion and to create an improved final fit for the weatherstrip.

As set forth above, the corner could also be traversed, in accordance with the process of the present invention, by providing an initially substantially straight intermediate leg 324 and providing the bend 358 at the appropriate preselected portions along its length, thereby adjusting the width, to provide the proper clearance at the corner portion. Thus, in accordance with the present invention, the weatherstrip 310 having an angular bend at the corner 312 would be formed with bend 358 on either side of the corner 312 to allow a wider width at the corner where it is needed and a narrower width as required for fitting on the belt shelf of the window aperture.

While the above description constitutes the preferred embodiments of the present invention, it is to be appreciated that the invention is susceptible to modification, variation and change without departing from the proper scope and fair meaning of the accompanying claims.

What is claimed is:

1. A weatherstrip adapted to engage an end flange of a vehicle for sealing between a glass window and a vehicle surface, said flange having an inner surface and an outer surface, said weatherstrip being expandable in its width to accomodate adaptability to various contours and dimensions of said vehicle surface, said weatherstrip comprising:

an elongated core substrate including an inner flange portion for placement adjacent said end flange, an outer flange portion and an intermediate portion connecting said outer flange portion with said inner flange portion;

a means for securing said elongated core substrate to said end flange; and a sealing lip member integral with said outer flange portion allowing sealing engagment between said outer flange and a window panel, said intermediate portion including a bend formed therein, said bend providing for adjustment of the width of said weatherstrip to accomodate varying final applications in a vehicle.

2. The belt weatherstrip of claim 1 wherein said inner flange and said outer flange define a channel therebetween and said intermediate portion is arcuately formed into the channel along its length.

3. A belt weatherstrip adapted to engage an end flange of a vehicle for sealing between a glass window and a vehicle show surface, said end flange having an inner surface facing toward a glass channel of a vehicle and an outer surface adjacent a show surface of a vehicle, the width of said weatherstrip being adjustable along its length to accomodate adaptability to various show surface requirements, said weatherstrip comprising:

an elongated core substrate including a flange portion for placement adjacent said inner surface of said flange, a show surface portion, and an intermediate portion connecting said flange portion with said show surface portion;

means for securing said elongated core substrate to said end flange;

a sealing lip member integral with said flange portion allowing slideable sealing engagement between said flange and a glass window, said sealing lip member having a transversely extending lip portion thereof overlying said intermediate portion of said core substrate; and a show surface member attached to said show surface portion of said sustrate and extending in overlapping engagement with the transversely extending lip member; said intermediate portion including a bend formed therein, wherein said bend may be selectively straightened to extend said show surface portion in a direction away from said outer surface of said flange for selectively widening the weatherstrip to accommodate varying contour or taper requirements of said show surface of said vehicle.

4. The blet weatherstrip of claim 3 wherein said flange portion and said show surface portion define a channel therebetween and said intermediate portion is arcuately formed into the channel along its length.

5. The belt weatherstrip of claim 4 wherein said show surface portion overlaps said transversely extending lip (lip) portion of said sealing lip member which overlay said intermediate portion of said flange and is slideable thereover such that when said intermediate portion is extended a seal is retained between said show surface and said extending tongue portion of said sealing lip member.

6. A belt weatherstrip adapted to engage an end flange of a vehicle for sealing between a slideable glass window and a door panel of a vehicle, said weatherstrip belt being selectively expandable to adjust for varying spaces between said door panel or said end flange and said slideable glass window, said end flange having an inner surface toward a glass channel and an outer surface facing away from the glass channel, said belt weatherstrip comprising:

and elongated core substrate including a securement flange portion, an outermost flange and an intermediate portion extending between said securement portion and said outermost flange portion, said securement flange portion including means for attachment of said weatherstrip to said end flange, a sealing lip member attached to said outermost flange for sealing between a glass window and a door panel or said end flange portion, said intermediate portion including a bend formed along the length of said core substrate, said intermediate portion being selectively unbendable to vary the width of coverage of said weatherstrip for adapting to varying spaces between said window glass and said door panel or said end flange.

7. The belt weatherstrip of claim 6 wherein said intermediate portion is arcuately formed outwardly along the length of said belt weatherstrip.

8. The belt weatherstrip of claim 6 wherein said sealing lip member further includes a transversely extending tongue portion for sealingly abutting a door panel of a vehicle.

9. A glass run weatherstrip having an expandable leg portion for allowing angular bends of said weatherstrip, said weatherstrip comprising:

an elongated core substrate having a width, said core substrate including a first flange portion along a first end of the width, along the length of the core substrate and a second flange portion at a second end of the width along the length of the core substrate and an intermediate leg portion therebetween, said first and second flange defining a glass run channel therebetween, said intermediate portion including a bend formed therein along the length of said weatherstrip in its normal position, said bend being straightenable to increase the length of said intermediate leg at a preselected location;

a first glass sealing lip extending into said channel from said first flange and a second glass sealing lip extending from said second flange into the channel for providing for slideable sealing engagement of a glass window therebetween; and a means for attaching said first flange to a door flange of a window aperture of a door of a vehicle, whereby the intermediate flange may be extended when forming the glass run weatherstrip at an angle for traversing a corner of the window aperture to provide clearance for the window in the glass run channel at the angled portion of the glass run weatherstrip.

10. The glass run weatherstrip of claim 9 wherein said intermediate leg has an arcuate bend into the glass run channel along the length of the channel.

11. The glass run weatherstrip of claim 9 wherein an expandable web is provided at the base of said bend in said intermediate leg for sealing of the bend in the normal position.

12. A glass run weatherstrip having an expandable leg portion for allowing extra clearance in the glass run channel at an angular bend in the weatherstrip, said weatherstrip comprising:

an elongated core substrate having a width, said core substrate including a "U" shaped flange portion at a first end of the width of the weatherstrip and a second flange at the other end of the width of the core substrate thereby defining a glass run channel therebetween, an intermediate leg portion connecting the "U" shaped flange and the second flange, said intermediate leg portion including an arcuate bend formed therein extending into the channel in its normal state;

an extruded outer covering extruded onto said core substrate, said outer covering including a first glass sealing lip extending into the glass run channel form the "U" shaped flange portion, a second glass sealing lip extending from the second flange into the channel for providing slideable sealing engagement of a glass window therebetween, and a retention structure extending into the channel formed by the "U" shaped flange for engaging the end flange of a window aperture, whereby the arcuate bend in the intermediate leg may be straightened when bending the glass run weatherstrip for traversing a corner of a window aperture, to lengthen the intermediate leg, thereby providing extra clearance in the glass run channel at the bend in the glass run weatherstrip.

13. A process for adjusting the width of a weatherstrip comprising the steps of: providing a weatherstrip including an elongated core substrate including a first flange adapted for securement to a flange of a vehicle, a second flange portion and an intermediate portion connecting said first flange and said second flange, said intermediate portion adapted for having a bend placed in its width along the length of said weatherstrip, said weatherstrip including means for attachment to a vehicle and flange and an eleastomeric sealing member attached to said core substrate for engaging a window pane of a vehicle; and forming a bend in said intermediate portion at preselected locations along the length of said weatherstrip for adjusting the width of the weatherstrip along the length thereof.

14. The process according to claim 13 wherein said weatherstrip is a belt weatherstrip.

15. The process according to claim 13 wherein said weatherstrip is a glass run weatherstrip.

16. The process according to claim 15 wherein said glass run weatherstrip is wider at an angular bend for traversing a corner of a window aperture by providing said bend in the intermediate portion at locations along the length of said glass run weatherstrip on either side of said angular bend.

* * * * *

UNITED STATES PATENT AND TRADEMARK OFFICE
CERTIFICATE OF CORRECTION

PATENT NO. : 4,949,507

DATED : August 21, 1990

INVENTOR(S) : Robert A. Vaughan

It is certified that error appears in the above-identified patent and that said Letters Patent is hereby corrected as shown below:

Column 1, line 27, "may" should be --many--.

Column 1, line 44, "construction" should be --constructions--.

Column 1, line 51, "thses" should be --these--.

Column 1, line 67, "toolin" should be --tooling--.

UNITED STATES PATENT AND TRADEMARK OFFICE
CERTIFICATE OF CORRECTION

PATENT NO. : 4,949,507

DATED : August 21, 1990

INVENTOR(S) : Robert A. Vaughan

It is certified that error appears in the above-identified patent and that said Letters Patent is hereby corrected as shown below:

Column 3, line 28, "referring" should be --Referring--.

Column 6, line 21, "applications" should be --application--.

Column 6, line 58, "extend" should be --extent--.

Column 6, line 64, "th" should be --the--.

Column 7, line 8, "benable" should be --bendable--.

Column 7, line 14, "commmonly" should be --commonly--.

Column 7, line 33, "removeable" should be --removable--.

Column 7, line 34, "becaus" should be --because--.

Column 7, line 44, "includs" should be --includes--.

Column 8, line 63, "accomodate" should be --accommodate--.

UNITED STATES PATENT AND TRADEMARK OFFICE
CERTIFICATE OF CORRECTION

PATENT NO. : 4,949,507

DATED : August 21, 1990

INVENTOR(S) : Robert A. Vaughan

It is certified that error appears in the above-identified patent and that said Letters Patent is hereby corrected as shown below:

Column 9, line 10, "accomodate" should be --accommodate--.

Column 9, line 22, "accomodate" should be --accommodate--.

Column 9, line 40, "sustrate" should be --substrate--.

Column 9, line 50, "blet" should be --belt--.

Column 9, line 55, before "portion" delete --(lip)--.

Column 9, line 68, after "surface" insert --facing--.

Column 10, line 3, "and" should be --an--.

Column 11, line 10, "form" should be --from--.

Column 12, line 8, "eleastomeric" should be --elastomeric--.

Signed and Sealed this

First Day of September, 1992

*Attest:*

DOUGLAS B. COMER

*Attesting Officer*  *Acting Commissioner of Patents and Trademarks*